Oct. 11, 1949.  C. C. HERSKIND ET AL  2,484,565
ELECTRIC VALVE EXCITATION AND CONTROL CIRCUIT
Filed Dec. 30, 1948

Inventors:
Carl C. Herskind,
Marvin J. Mulhern,
by Prowell P. Mack
Their Attorney.

Patented Oct. 11, 1949

2,484,565

UNITED STATES PATENT OFFICE 2,484,565

ELECTRIC VALVE EXCITATION AND CONTROL CIRCUIT

Carl C. Herskind and Marvin J. Mulhern, Schenectady, N. Y., assignors to General Electric Company, a corporation of New York Application December 30, 1948, Serial No. 68,278

9 Claims. (Cl. 315—246)

Our invention relates to electric valve excitation circuits, and more particularly to excitation and control circuits for electric valves of the ignitron type provided with an immersion ignitor having in addition a grid or analogous electrode to effect accurate starting and rapid deionization.

In electric valves of the ignitron type utilizing grids to effect accurate starting and rapid deionization, difficulties have been encountered when the ignitor fails to fire and establish a cathode spot on the mercury pool or for some other reason the cathode spot fails to form on the mercury pool. If under these conditions the grid is made positive, the residual ionization in the valve may form a cathode spot by bombardment on the side walls and other equally undesirable locations within the valve envelope.

Several solutions of this problem have been proposed and used heretofore. One arrangement is that described and claimed in Patent 2,419,465 granted April 22, 1947, upon an application of B. D. Bedford and assigned to the assignee of the present application. In this Bedford arrangement an excitation anode circuit upon the establishment of a cathode spot triggers or switches the grid excitation circuit through an interlocking or coupling circuit so that the grid circuit does not become energized and permit discharge between the main anode and cathode unless the cathode spot is formed in the normal and intended manner on the mercury pool.

It is an object of our invention to provide an improved excitation and control circuit of the above described type whereby certain protective features are provided and certain expensive component elements of the excitation circuit may be eliminated and the circuit rendered simpler and less expensive for general application.

Our invention will be better understood from the following description taken in connection with the accompanying drawing and its scope will be pointed out in the appended claims.

Figure 1:
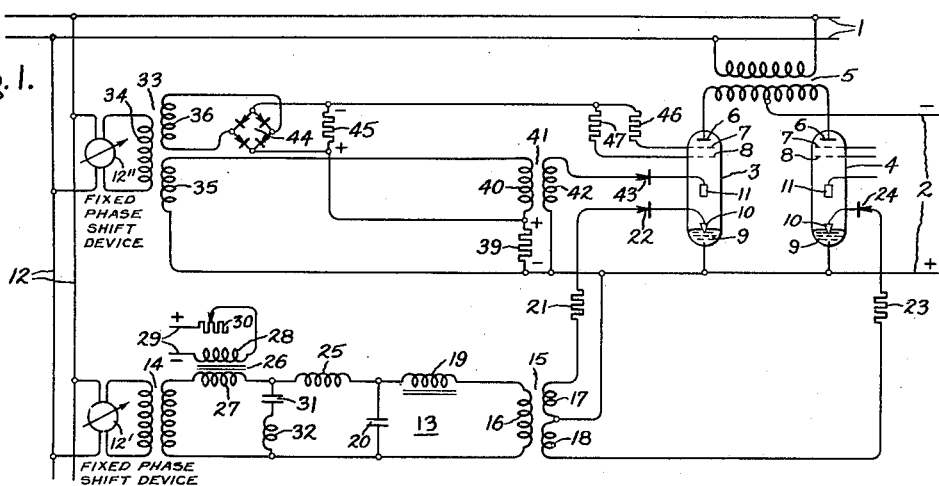
Figure 2:
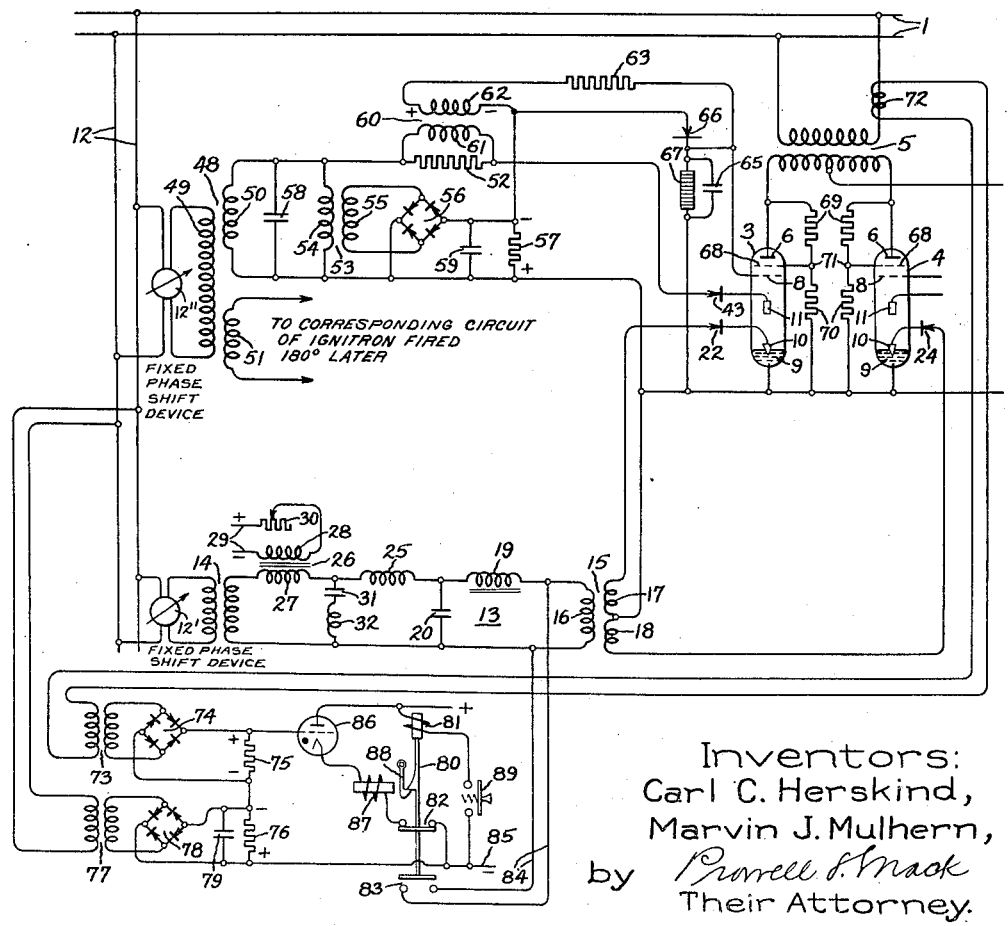

In the drawing Fig. 1 is a diagrammatic representation of our invention utilizing a simplified arrangement of coupling transformer between the holding anode circuit and the grid control circuit of a grid controlled ignitron, and Fig. 2 illustrates a modified arrangement of the embodiment illustrated in Fig. 1 with further protective means.

In Fig. 1 of the drawing we have illustrated a simplified embodiment of our invention applied to an electric valve converting system illustrated as a single phase rectifier, although it will be obvious to those skilled in the art that our invention is equally applicable to the various commercial types of polyphase rectifiers and the two rectifier tubes illustrated may be considered as representative of the two tubes displaced in phase by 180 degrees of any polyphase rectifier system. The converting system, as illustrated, comprises an alternating current circuit 1 and a direct current circuit 2 interconnected in a conventional manner by a pair of electric valves 3 and 4 and a suitable converter transformer 5.

The particular valve illustrated is of the grid controlled ignitron type such as that described and claimed in U. S. Patent No. 2,209,819, granted July 30, 1940, upon an application of K. H. Kingdon. For the purpose of explaining our invention as utilized in a converter system, it will suffice to refer to one of the valves, such as 3, for application of the excitation and control circuits of our invention, since each pair of valves displaced 180° in any polyphase system will be energized from an excitation circuit the same as that illustrated and described below.

Each valve comprises the usual enclosing envelope having therein an anode 6, a first electrode or grid 7 which acts as an intermediate anode and a control electrode or grid 8 which determines the time of starting and reduces the deionization period at the end of conduction. In addition, each of the valves 3 and 4 is provided with a mercury pool cathode 9 and an ignitor 10. Above the surface of the mercury is arranged a holding anode or excitation anode 11 which functions primarily to maintain the cathode spot after the spot has been initiated by the ignitor 10 and to perform the other functions hereinafter described.

The power supply for both the ignitor circuits and the grid circuits may conveniently be obtained, as illustrated, from a bus 12 energized from the circuit 1. The ignitor firing circuit 13 for the ignitors 10 is connected to be energized from the bus 12 through a fixed phase shift device 12' and a transformer 14. The desired phase shift may also be accomplished with a polyphase system by selecting the proper phases to furnish the voltages of fixed phase displacement. The specific form of the ignitor firing circuit 13 forms no part of our invention and any suitable type may be selected for the purpose of obtaining a complete excitation and control circuit in accordance with our invention. A satisfactory type of ignitor firing circuit 13 is of the tubeless or so-called magnetic type as disclosed and claimed in U. S. Patent 2,362,294 granted November 7, 1944 upon an application of A. H. Mittag. The ignitor circuit 13, as illustrated, is energized from the transformer 14 and connected to the ignitors 10 of the valves 3 and 4 through an insulating transformer 15 having a primary winding 16 and a pair of secondary windings 17 and 18. The insulating transformer is used to transform the ignitor peaks up to the high potential level of the valves. The primary winding 16 is energized through a non-linear reactance or firing reactor 19 and a shunt connected capacitor 20, which elements in combination upon discharge of the capacitor 20 through the reactor 19 cause a peak of voltage to be generated across the secondary windings 17 and 18. These impulses of voltage occur twice during each cycle of the voltage of bus 12 at times determined by the saturation of the reactor 19. Since the two ignitors 10 are energized from the transformer 15 on opposite half cycles of applied voltage, a common or mid-terminal of windings 17 and 18 is connected to the cathodes 9 of the valves 3 and 4. The outer terminal of winding 17 is connected through a current limiting resistor 21 and a unidirectional conducting device 22 to ignitor 10 of valve 3. Similarly, the outer terminal of winding 18 is connected through a current limiting resistor 23 and a unidirectional conducting device 24 to ignitor 10 of valve 4. The circuit 13 also includes a linear reactor 25 connected between the transformer 14 and the capacitor 20 and serves to prevent discharge of the capacitor to the supply circuit upon saturation of the firing reactor 19 and also serves to limit the amount of current derived from the supply circuit at the time capacitor 20 discharges through transformer winding 16. The firing circuit 13 also includes a phase shifting means comprising a saturable inductive device comprising a core 26 and an alternating current winding 27 thereon connected in series relation with the excitation circuit between the supply transformer 14 and the linear reactor 25. The saturable reactor is also provided with a suitable control means such as a direct current control winding 28 connected to be energized from a suitable direct current source 29 through a controlling resistance 30. A voltage regulating means for maintaining the voltage substantially constant throughout an appreciable range of phase shift of the output circuit comprising a capacitor 31 is connected across the excitation circuit intermediate the phase shift device winding 27 and the linear reactor 25. A reactor 32 is connected in series with capacitor 31 to suppress undesirable oscillations.

Since the ignitor firing circuit 13 furnishes current to the ignitors 10 for only a relatively few electrical degrees after the ignitor fires, the holding anode 11 is utilized to maintain the cathode spot on the mercury pool cathode 9 for substantially the remainder of the half cycle of positive anode voltage. The holding anode 11 and grids 7 and 8 may also be energized from the bus 12 through a grid insulating transformer 33 comprising a primary winding 34 connected to the bus 12 and two secondary windings 35 and 36. The voltage derived from transformer 33 is usually phased ahead of the main anode voltage by a fixed phase shift device 12'' so that it will be sufficiently positive when emission takes place to maintain the cathode spot. Such phase displacement may also be obtained in a polyphase system by suitable selection of phase voltages of proper phase displacement. The secondary winding 35 of the transformer 33 is connected to energize a positive bias resistor 39 through primary winding 40 of a coupling transformer 41. The transformer 41 is provided with a secondary winding 42 having one terminal thereof connected to the cathode circuit 9 of valve 3 and the other terminal to holding anode 11 through a unidirectional conducting device 43. With this connection on the positive half cycle of anode voltage of valve 3, the major portion of the voltage of winding 35 appears across the primary winding 40 and effects energization of the holding anode 11. If the cathode spot has been formed, current flows in the holding anode circuit including the upper terminal of transformer 42, rectifier 43, the arc path to cathode 9 and back to the lower terminal of transformer 42. As soon as current flows in the holding anode circuit 11 a voltage of steep wavefront appears across the resistor 39 of the polarity shown due to the low impedance of the circuit of secondary winding 42, and this voltage constitutes a positive firing voltage for the grids 7 and 8.

When the anode voltage of valve 3 is negative or when the anode voltage is positive and no excitation arc is present, it is necessary to maintain the grids 7 and 8 at a negative potential relative to the cathode. A negative bias voltage for the grid 7 and control grid 8 is supplied by any suitable rectifier shown as a diametric, double-way rectifier 44 connected to be energized from the secondary winding 36 of transformer 33 and having an output circuit connected to a resistor 45 serving as a negative bias resistor with the polarity as indicated. The positive terminal of resistor 45 is connected to the positive terminal of positive bias resistor 39, and the negative terminal is connected to grid 7 through a resistor 46 and to grid 8 through a resistor 47. The resistor 47 as indicated is of a higher value than the resistor 46, in order to insure that grid 8 and grid 7 will conduct the proper relative currents during firing and during deionization. The circuit for the grids 7 and 8 to the cathode 9, therefore, comprises in opposed series relation a negative bias voltage from resistor 45 and a larger and controlling positive bias voltage from resistor 39 at any time current flows in the circuit of holding anode 11.

The general sequence of operation of the ignition and excitation circuits of the electric valve system shown in Fig. 1 is substantially as follows: The ignitor circuit 13 as shown generates, when energized, a positive peak of current in each half cycle of applied voltage upon discharge of capacitor 20 through the firing reactor 19 and the firing transformer 15. The peak on one-half cycle of given polarity causes current to flow through ignitor 10 of valve 3 to establish a cathode spot and the peak on the following half cycle causes current to flow 180 degrees later through ignitor 10 of valve 4. Prior to the establishment of the cathode spot the grids 7 and 8 are under control of the negative bias resistor 45 and are therefore at a negative potential relative to the associated cathode 9, since little or no current flows through resistor 39 due to the high impedance of transformer 41 with its secondary winding 42 in open circuit. Upon establishment of the cathode spot, the current in the circuit of auxiliary anode 11 starts to flow and maintains the cathode spot after the ignitor peak has subsided. As soon as the auxiliary anode 11 is rendered conductive, the current in the circuit of resistor 39 abruptly increases and establishes across it a positive bias voltage of steep wavefront to overcome the negative bias voltage across resistor 45 and thereby render grids 7 and 8 positive and establish conductivity in valve 3.

The circuit of holding anode 11 thus performs four functions, namely (1) it maintains the cathode spot after the spot is once initiated on the mercury pool by the ignitor, (2) it, in effect, switches the grid circuit or circuits from a negative bias voltage condition to a positive bias and firing voltage condition, (3) establishes a steep wavefront firing voltage without the use of special peaking transformer or equivalent device, and (4) it permits use of a simple transformer with proper selection of turn ratio without direct current anti-saturation means.

In Fig. 2 of the drawing we have shown a modification of our invention utilizing the same principle of introducing a positive firing voltage from a resistor in the holding anode circuit through a coupling transformer but in this embodiment the resistor forming the source of positive bias voltage is directly in series with the holding anode rather than in series relation with the coupling transformer, so as to avoid possible variations due to changes in transformer magnetizing current.

In order to simplify comparison of the two embodiments and render unnecessary a repetition of the description of corresponding circuits and elements, we have identified corresponding circuits and elements in the two embodiments with like numerals. The tubes 3 and 4 of the electric valve converter are of the same type as that described in Fig. 1, and the ignitor firing circuit 13 as illustrated is also the same.

The grid excitation and control circuit is energized from the bus 12 through a fixed phase shift device 12″ and a coupling transformer 48 having a primary winding 49 connected to bus 12 and dual secondary windings 50 and 51. The circuit 51, as indicated by the notation, is connected to the valve 4 or that valve of the conversion circuit which is fired 180° later than valve 3. The secondary winding 50 has the upper terminal, as illustrated in the drawing, connected through a resistor 52 and the unidirectional conducting device 43 to the holding anode 11. When the holding anode is not conducting current, the control grid 8 is maintained at a negative bias potential relative to its associated cathode. This negative bias voltage is obtained from a transformer 53 having a primary winding 54 connected across the transformer winding 50 and its secondary winding 55 connected through a rectifier 56 to energize a resistor 57 with direct current to establish a negative bias voltage with the polarity in the direction as indicated. A capacitor 58 is connected across the primary winding 54 of transformer winding 53 to hold the applied voltage substantially constant during large shifts in the load current of transformer 48. A smoothing capacitor 59 is connected across the output circuit of rectifier 56 and thus in parallel with resistor 57. The positive firing voltage for the control grid 7 is obtained from a permissive transformer 60 having a primary 61 connected across the holding anode resistor 52 and a secondary winding 62. The secondary winding 62 has one terminal thereof at which the negative voltage appears connected to the negative terminal of negative bias resistor 57, and the other terminal of positive potential connected through a resistor 63 to control grid 8. The resistor 63 serves to limit grid current during conduction of valve 3 and also prevents excessive ion current flow in the reverse direction during the period immediately after the main anode 6 ceases conducting.

A unidirectional conducting device 66 is connected from the grid terminal of resistor 63 to the junction between the secondary winding 62 of the coupling transformer and the negative terminal of negative bias resistor 57, and is poled in a direction which permits current flow from this junction (between secondary winding 62 and negative terminal of 57) to the opposite end of winding 62 through resistor 63. This prevents sudden application of a steep wavefront of negative voltage from being applied to the grid 8 at the end of conduction, which might be detrimental to the operation of the ignitron 3 by possibly causing arc-back. This steep wavefront of negative voltage across winding 62 occurs when the holding anode 11 ceases to conduct current and thereby causes a cessation of current in winding 61. A capacitor 65 is connected between the grid 8 and cathode 9 and provides a low-impedance path to the cathode for transient voltages which might appear at the grid due to inductive or electrostatic effects. These transient voltages, if not by-passed, might be sufficient during abnormal conditions to fire the grid. A resistor 67 is connected in parallel with the capacitor 65 to prevent the build-up of large or excessive voltages at the grid due to high currents which could flow under fault conditions. The resistor 67 preferably should have a nonlinear volt-ampere characteristic, such as the resistance material having the trade-mark "Thyrite" which is disclosed and claimed in U. S. Patent No. 1,822,742, granted September 3, 1931 upon an application of Karl B. McEachron. A resistor of the nonlinear type suggested has a characteristic which produces only a small increase in voltage drop when the current is increased several times.

If a type of tube is used having a gradient grid 68 to divide the anode-to-cathode voltage in the space between anode and cathode, such grid may be energized by a voltage dividing resistance comprising resistance elements 69 and 70 connected in series relation across anode 6 and cathode 9 and having a junction terminal 71 connected to grid 68. These resistors may be chosen to apply one-half anode voltage to the gradient grid 68.

The interlocking features of the grid and holding anode circuits above described prevent any firing signals from reaching the grid 8 in the event of a failure of the ignitor 10 to establish a cathode spot on the mercury pool 9, or when it may be desirable to block the firing circuit of ignitors 10. The ignitors may be blocked in the event of an arc-back or for other control purposes. A current transformer 72 is connected in series relation with the supply circuit to rectifier transformer 5 and is connected to a small transformer 73 to provide a rectified voltage signal through a rectifier 74 across a positive bias signal resistor 75. A fixed negative bias resistor 76 is connected to be energized from bus 12 through a transformer 77 and a rectifier 78. A smoothing capacitor 79 is connected across resistor 76. The voltage components across these two resistors 75 and 76 are differentially related and the resultant voltage utilized to effect operation of protective equipment which, as illustrated, comprises a relay 80 provided with an operating coil 81 and two sets of contacts 82 and 83. The contacts 82 are normally closed and contacts 83 are normally open. The contacts 83 are arranged to close a closed or short circuit through circuit 84 across the primary winding 16 of the ignitor transformer 15, and the contacts 82 are normally closed to complete a control circuit from a control bus 85 through a thyratron 86 and a tripping coil 87. The tripping coil 87 is arranged in cooperative relation with a latch on relay 80 to release a latch 88 when coil 87 is energized and effect opening of contacts 82 and closure of contacts 83 to short circuit transformer 15. The coil 81 of switch 80 is connected in series with a manual reset switch 89 across the control bus 85. The thyratron 86 is reset by the opening of contacts 82.

The general sequence of operation of the ignition and excitation circuits of the electric valve system shown in Fig. 2 is substantially as follows: The ignitor circuit 13 as shown generates, when energized, a positive peak of current in each half cycle of applied voltage upon discharge of capacitor 20 through the firing reactor 19 and the ignitor coupling transformer 15 as previously described. Upon establishment of the cathode spot on the mercury pool 9, current starts to flow in the circuit of holding anode 11 and a voltage drop across resistor 52 suddenly appears. This voltage is impressed across the primary winding of the permissive transformer 69. The voltage across the secondary winding of this transformer rises rapidly from zero to a positive value sufficient to overcome the negative bias voltage across resistor 57 and thus energize the control grid with a positive potential and effect conduction in valve 3. The ratio of the transformer 69 is chosen so that sufficient voltage is available to maintain grid conduction during the period that the holding anode 11 is conducting. When the holding anode 11 ceases conduction the voltage across resistor 52, and thus across winding 62, is reduced to zero and the negative bias voltage from resistor 57 impresses on grid 8 a negative potential and so prevents further conduction until the occurrence of the next pulse from ignitor 10.

In the event of an overcurrent in the primary or secondary winding of transformer 5, a voltage appears across transformer 73 and thence across resistor 75 to overcome the negative bias voltage across resistor 76 and thus render thyratron 86 conductive. Upon conduction of thyratron 86, trip coil 87 is energized to release latch 88 and thus close contacts 83 to short circuit the ignitor transformer and block the excitation signal to the ignitrons. The interlocking features of the grid and holding anode circuits prevent any firing signals from reaching these electrodes.

It will be observed from the above description that the circuit of holding anode 11 performs the four functions of (1) maintaining the cathode spot, (2) switching the grid circuit, (3) establishing a steep wavefront firing voltage, and (4) eliminates special direct current anti-saturation means as have been recited in more detail for the embodiment of our invention illustrated in Fig. 1.

While we have shown and described particular embodiments of our invention, it will be obvious to those skilled in the art that various changes and modifications may be made without departing from our invention, and we, therefore, aim in the appended claims to cover all such changes and modifications as fall within the true spirit and scope of our invention.

What we claim as new and desire to secure by Letters Patent of the United States is:

1. In combination, an electric discharge device of the type employing an enclosing envelope and comprising therein an ionizable medium, an anode, a cathode and a control electrode, means for initiating electron emission at said cathode, an auxiliary electrode within said envelope, an energizing circuit connected to said auxiliary electrode for establishing a path for electron emission from said cathode to said auxiliary electrode, an energizing circuit connected to said control electrode, means responsive to current flow in said auxiliary electrode circuit for producing a voltage variable in accordance with such current flow, and inductive coupling means interconnecting said auxiliary electrode circuit and the energizing circuit of said control electrode for impressing a voltage derived from said second-mentioned means upon said control electrode in dependence upon current flow in said auxiliary electrode circuit.

2. In combination, an ignitron comprising an anode, a mercury pool cathode, an immersion ignitor and a control grid, a voltage peaking circuit connected to said ignitor for periodically establishing electron emission at said cathode to establish a cathode spot thereon, a holding anode within said ignitron, an energizing circuit connected to said holding anode for establishing a path of electron emission from said cathode to said holding anode, an energizing circuit connected to said control grid, a resistor connected in a circuit with said holding anode circuit for producing a voltage across said resistor variable in accordance with current flow in said holding anode circuit, and a coupling transformer interconnecting said holding anode circuit and said grid circuit for impressing upon said grid a voltage derived from said resistor.

3. In combination, an ignitron comprising an anode, a mercury pool cathode, an immersion ignitor and a control grid, a voltage peaking circuit connected to said ignitor for periodically establishing electron emission at said cathode to establish a cathode spot thereon, a holding anode within said ignitron, a holding anode circuit interconnecting said holding anode and said cathode for establishing a path of electron emission from said cathode to said holding anode, an energizing circuit including a resistor connected in series relation therewith for energizing said holding anode circuit, an excitation circuit including said resistor and connected to said control grid, and a transformer interconnecting said holding anode circuit and said energizing circuit of said holding anode circuit.

4. In combination, an ignitron comprising an anode, a mercury pool cathode, an immersion ignitor and a control grid, a voltage peaking circuit connected to said ignitor for periodically establishing electron emission at said cathode to establish a cathode spot thereon, an auxiliary holding anode within said ignitron, a holding anode circuit interconnecting said holding anode and said cathode for establishing a path of electron emission from said cathode to said holding anode, an energizing circuit including a resistor connected in series relation therewith for energizing said holding anode circuit, an excitation circuit including said resistor and connected to said control grid, and a coupling transformer having a primary winding included in the energizing circuit for said holding anode and a secondary winding included in series relation with said holding anode for interconnecting said energizing circuit for said grid and said holding anode circuit.

5. In combination, an electric discharge device of the type employing an enclosing envelope and comprising therein an ionizable medium, an anode, a cathode and a control electrode, means for initiating electron emission at said cathode, an auxiliary electrode within said envelope, an energizing circuit connected to said auxiliary electrode for establishing a path of electron emission from said cathode to said auxiliary electrode, an energizing circuit connected to said control electrode, means connected in the energizing circuit of said auxiliary electrode and responsive to current flow therein for producing a voltage variable in accordance with such current flow, and inductive coupling means connected to said second-mentioned means and to said energizing circuit of said control electrode for impressing thereon the voltage produced by said second-mentioned means.

6. In combination, an ignitron comprising an anode, a mercury pool cathode, an immersion ignitor and a control grid, a voltage peaking circuit connected to said ignitor for periodically establishing electron emission at said cathode to establish a cathode spot thereon, an auxiliary holding anode within said ignitron, a holding anode circuit including a source of voltage and a resistor connected in series relation with said holding anode, an energizing circuit connected to said grid, and a transformer having a primary winding connected across said resistor and a secondary winding connected in series relation with said energizing circuit of said grid for coupling said holding anode circut and said energizing circuit.

7. In combination, an ignitron comprising an anode, a mercury pool cathode, an immersion ignitor and a control grid, a voltage peaking circuit connected to said ignitor for periodically establishing electron emission at said cathode, a holding anode within said ignitron, a holding anode circuit including a source of voltage and a positive bias resistor connected in series relation with said holding anode, an energizing circuit connected to said grid and to said cathode, a negative bias resistor connected in series relation with said grid energizing circuit, means including a rectifier connected to said source of voltage for energizing said negative bias resistor and normally maintaining said grid at a negative potential relative to said cathode, and a transformer having a primary winding connected across said positive bias resistor and a secondary winding connected in series relation with said negative bias resistor and said grid, said secondary winding being arranged upon current flow to said holding anode to provide a greater and opposing voltage with respect to the voltage of said negative bias resistor and thereby render said grid positive with respect to its cathode and effect conduction between said anode and cathode.

8. In combination, an electric discharge device employing an enclosing envelope and comprising therein an ionizable medium, an anode, a cathode and a control electrode, a voltage peaking circuit including a transformer connected to said ignitor for periodically establishing electron emission at said cathode, means responsive to current flow above a predetermined value to said anode for short circuiting said transformer, an auxiliary electrode within said envelope, an energizing circuit connected to said auxiliary electrode for establishing a path of electron emission from said cathode to said auxiliary electrode, an energizing circuit connected to said control electrode, means connected in the energizing circuit of said auxiliary electrode and responsive to current flow therein for producing a voltage variable in accordance with such current flow, and inductive coupling means connected to said second-mentioned means and to said energizing circuit of said control electrode for impressing thereon the voltage produced by said second-mentioned means.

9. In combination, an ignitron comprising an anode, a mercury pool cathode, an immersion ignitor and a control grid, a voltage peaking circuit including a transformer connected to said ignitor for periodically establishing electron emission at said cathode, switching means for short circuiting said transformer, means including an electric valve and responsive to current above a predetermined value to said anode for effecting operation of said switching means, a holding anode within said ignitron, a holding anode circuit including a source of voltage and a positive bias resistor connected in series relation with said holding anode, an energizing circuit connected to said grid and to said cathode, a negative bias resistor connected in series relation with said grid energizing circuit, means including a rectifier connected to said source of voltage for energizing said negative bias resistor and normally maintaining said grid at a negative potential relative to said cathode, and a transformer having a primary winding connected across said positive bias resistor and a secondary winding connected in series relation with said negative bias resistor and said grid, said secondary winding being arranged upon current flow to said holding anode to provide a greater and opposing voltage with respect to the voltage of said negative bias resistor and thereby render said grid positive with respect to the cathode and effect conduction between said anode and cathode.

CARL C. HERSKIND.
MARVIN J. MULHERN.

No references cited.